United States Patent

[11] 3,611,095

| [72] | Inventor | Albrecht Schnizler<br>Nurtingen/Wurttemberg, Germany |
|---|---|---|
| [21] | Appl. No. | 828,522 |
| [22] | Filed | May 28, 1969 |
| [45] | Patented | Oct. 5, 1971 |
| [73] | Assignee | Metabowerke KG. Closs, Rauch &<br>Schnizler<br>Nurtingen, Germany |
| [32] | Priority | May 31, 1968 |
| [33] | | Germany |
| [31] | | P 17 63 455.8 |

[54] SPEED CONTROL AND OVERLOAD PROTECTION DEVICE FOR AN ELECTRIC POWER TOOL
6 Claims, 3 Drawing Figs.

[52] U.S. Cl. .................................. 318/305,
310/50
[51] Int. Cl. .................................. H01h 21/22,
H02p 7/00
[50] Field of Search .......................... 318/301,
305, 347–349, 514, 345; 310/50, 68.1–68.4;
200/157; 337/3, 367; 338/200

[56] References Cited
UNITED STATES PATENTS

| 3,085,169 | 4/1963 | Abel | 310/68 |
| 3,187,248 | 6/1965 | Cardin | 318/473 |
| 3,328,613 | 6/1967 | Gawron | 310/68 X |
| 3,458,793 | 7/1969 | Tsergas | 310/68 X |

Primary Examiner—Oris L. Rader
Assistant Examiner—Robert J. Hickey
Attorney—Michael S. Striker ABSTRACT: A device for protection against overload and burnout in electric power tools having electronic regulating means. A spring-biased speed selector is rotatable from an intermediate position which defines a minimum operating speed in either a clockwise or counterclockwise direction. The speed selector is rotated in one direction from the intermediate position to set the operating speed and is opposed by the bias of the spring during rotation in an opposite direction to select a speed below the minimum operating speed which might cause overload or burnout of the tool

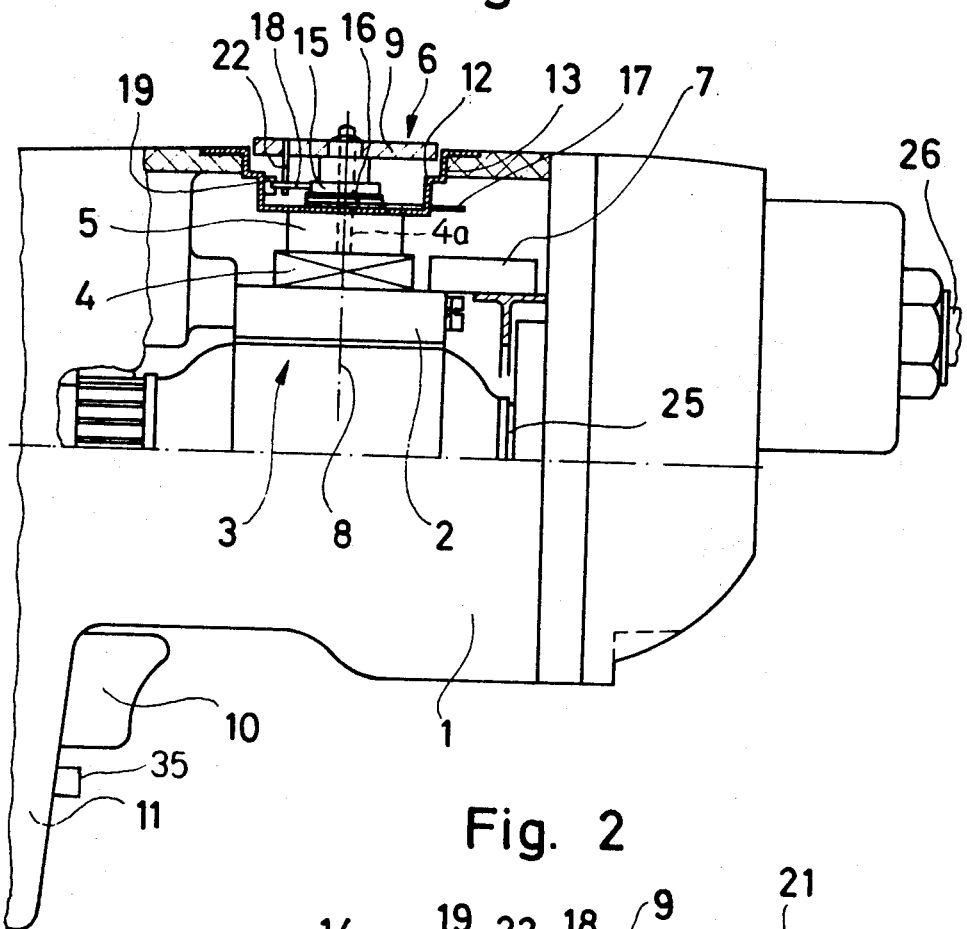
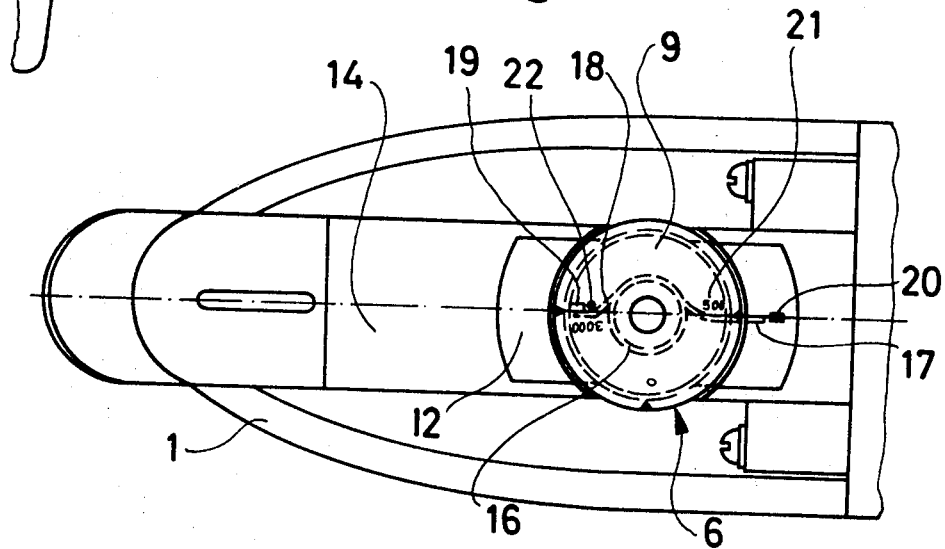

SPEED CONTROL AND OVERLOAD PROTECTION DEVICE FOR AN ELECTRIC POWER TOOL

BACKGROUND OF THE INVENTION

The present invention relates to an electric power tool having an electronic speed regulating device partly controlled by a potentiometer used in conjunction with a manually operated rotary element, the position of which determines the rotational speed of the tool. Electric power tools of this type, particularly electric hand drills are widely used by "do-it-yourself" enthusiasts for various applications such as the drilling of various materials, grinding, milling, sanding, polishing, planing, turning and the like. Dependent upon the particular application, or in some instances, the surface finish which may be desired, the power tool must be operative over a wide range of rotational speeds. Each speed level usually is set by means of simple and well known electronic regulating devices.

The colling apparatus for such power tools generally provides a cooling air flow mass that is approximately a quadratic function of the rotational speed per unit of time. This therefore causes an undue heating of the motor coil windings at increased rotational speeds and consequently an overloading of the motor causing it to burn out.

Presently known speed regulating devices used to protect against overloading are generally dependent upon the current consumption of the motor and are effective only over a limited speed range. For example, an adequate overload protection for the speed range of 0 to 3,000 r.p.m. is particularly difficult and costly to achieve.

SUMMARY OF THE INVENTION

It is an object of this invention to provide a novel device for the prevention of overloading in an electric power tool having electronic speed regulation means.

Another object of this invention is to provide a novel device for the prevention of overloading in an electric power tool having electronic speed regulation means which is simple to operate.

Another object of this invention is to provide a novel device for the prevention of overloading in an electric power tool having electronic speed regulation means which is operatively reliable.

A further object of this invention is to provide a novel device for the prevention of overloading in an electric power tool having electronic speed regulation means which is relatively inexpensive to construct.

The device for the prevention of overloading in an electric power tool having electronic speed regulation means comprises a motor means having an output member which is rotatable within a predetermined range of speeds and a speed regulating means which includes an adjustable potentiometer means and a regulating member for the potentiometer means. The regulating member is rotatable between two end positions and through a plurality of intermediate positions each of which corresponds to a different speed of the output member within the range of speeds. There is also provided a spring means for biasing the regulating member to a predetermined intermediate position.

A stop means is provided for engaging the spring means when the regulating member is in the predetermined position. The spring means is arranged to store energy in response to movement of the regulating member to an end position which corresponds to zero speed of the output member.

The novel features which are considered as characteristic of the invention are set forth in particular in the appended claims. The overload protection device however, both as to its construction and its method of operation, together with additional features and advantages thereof, will be best understood from the following description of specific embodiments when read in connection with the accompanying drawings.

BRIEF DESCRIPTION OF THE DRAWINGS

FIG. 1 is a partly sectional elevational view of a portion of an electric power tool, in which the present invention has been incorporated;

FIG. 2 is a plan view of the electric power tool depicted in FIG. 1; and

DESCRIPTION OF THE PREFERRED EMBODIMENTS

Figure 3:
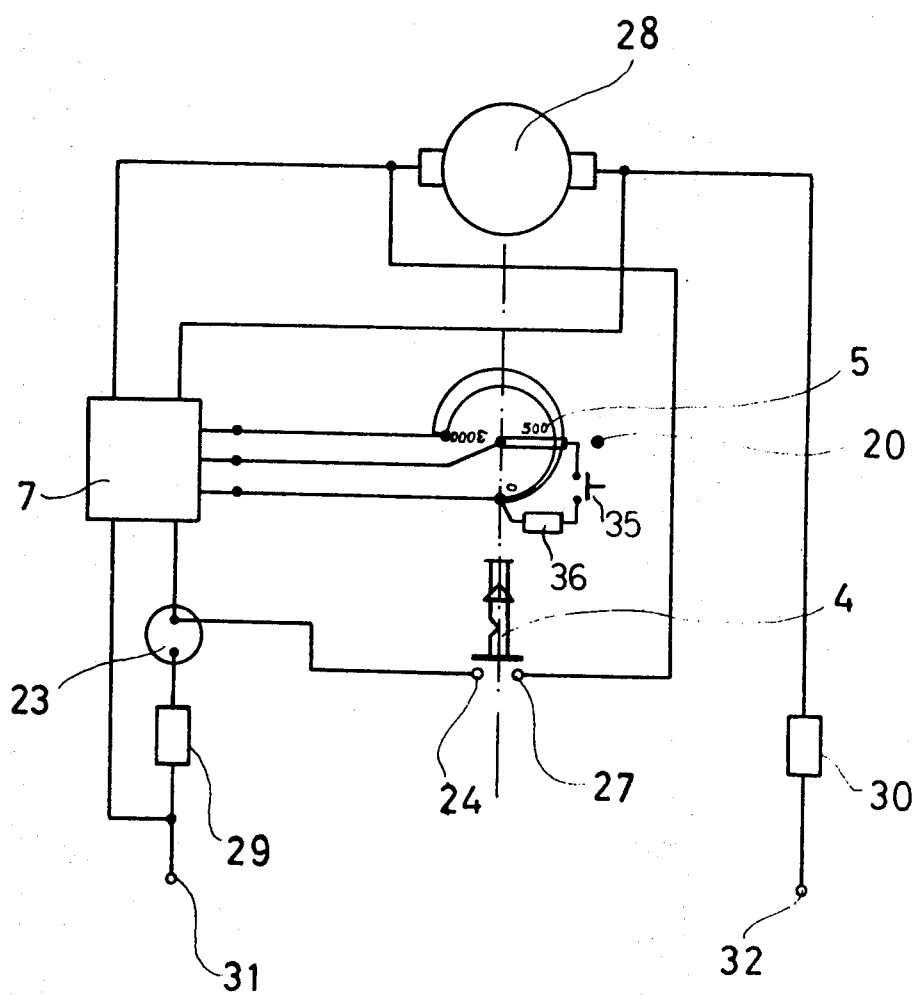
FIG. 3 is a schematic diagram of the electrical circuitry of the power tool depicted in FIG. 1.

Referring to FIGS. 1, 2 and 3, there is shown an electric power tool in the form of an electric hand drill having a housing 1 in which there are arranged stator laminations 2 and motor means 3, a switch means 4, potentiometer means 5 having a regulating member 6 and an electronic regulating device 7. Motor means 3 drives an output member 25 which in turn rotates a rotary tool carrier 26. As shown in FIG. 3, motor means 3 also includes an armature 28 and field windings 29 and 30. The regulating member 6 is constructed in the form of a rotary element or speed selector wheel 9 which is rotatable about axis 8. A conventional on-off switch is built into handle 11 and is actuated by means of trigger 10.

Switch means 4 and potentiometer means 5 are coaxially arranged below wheel 9 and above motor means 3 as shown in FIG. 1. Referring to FIGS. 1 and 3, when wheel 9 is depressed switch means 4 operates to bridge contacts 24 and 27 thereby short-circuiting electronic regulating device 7 so that the power tool can operate under an applied line voltage from line connections 31 and 32.

An arrangement which is particularly simple to manufacture and assemble is that in which switch means 4 and potentiometer means 5 are mounted on a carrier or chassis 12 which is insertable into opening 13 in housing 1 and fastened thereto by conventional fastener means. Wheel 9 is designed to be large enough so that it protrudes laterally beyond the top portion 14 of housing 1 such that it can be grasped either from the sides or the top of the power tool, thereby facilitating positioning it for various speed settings.

Potentiometer 5 has a collar 15 on which wheel 9 is mounted and surrounding which there is also a torsion spring 16. One end 17 of spring 16 is rigidly affixed to chassis 12 as shown in the FIGURES while the other end 18 which projects outward from spring 16 about 180° away from end 17 is movable with respect to stop means 19. The position of wheel 9 determines the number of revolutions per minute of output member 25 and hence rotary tool carrier 26 when switch means 4 is opened. An indicator mark 20 is applied to the surface of chassis 12 and there are numerical graduations 21 on wheel 9 which have values corresponding to the speed range of the power tool. Thus the rotational speed of the power tool at any given position of wheel 9 is directly determinable merely by noting the numerical value which lies opposite indicator mark 20.

Wheel 9 includes transmitting portion in the form of a pin 22 which projects from the undersurface of wheel 9. Stop means 19 and pin 22 cooperate in such a manner that when end 18 of spring 16 contacts stop means 19, wheel 9 is in a position which corresponds to an intermediate speed within the speed range of the power tool, which for the purpose of example is shown in FIG. 2 as 500 revolutions per minute. Wheel 9 can be constructed in such a manner that it is not movable along axis 8 to cause switch means 4 to contact contacts 24 and 27. Instead, there can be a bolt or pin 4a located in the center of the wheel which is movable along axis 8 to cause switch means 4 to operate. In either case, the operation of potentiometer 5 by means of wheel 9 remains independent of the operation of switch means 4. Thus the power tool is particularly suited for operation at a steady speed level.

Wheel 9 is rotatable from this intermediate position in either a clockwise or counterclockwise direction. If, for any reason, speed selector wheel 9 is rotated counterclockwise and the rotational speed decreases to a speed below 500 r.p.m., as soon as the wheel is released it will immediately return to the intermediate position of 500 r.p.m. because of the bias of spring 16. Thus end 18 of spring 16 will also return to contact stop means 19. This means that wheel 9 will always automatically return to the intermediate position of 500 r.p.m., thereby assuring a sufficient speed of rotation of the output member 25 and consequently preventing any overloading at rotational speeds below 500 r.p.m. If wheel 9 is accidentally rotated counterclockwise by jarring, contact with the workpiece, or as a result of ordinary carelessness on the part of the operator, as soon as the wheel is released, the intermediate speed level of 500 r.p.m. is quickly restored. Occasionally it may be necessary to operate the tool at speeds below 500 r.p.m. for limited periods of time. At such reduced speeds the overload protection device 23, for instance, a bimetallic device, usually constructed to open at a current which at high rotational speeds of the motor and resulting increased cooling is still admissible, will act with undue delay to prevent overloading and possible burnout of the motor, and spring 16 will assure that the motor, when operated at low speed, will immediately be returned to a higher speed when the wheel 9 is released by the operator.

When wheel 9 is turned in a clockwise direction, the rotational speed increases correspondingly until a maximum rotational speed of 3,000 r.p.m. is reached as indicated by the numerical graduations 21 on wheel 9. Whatever position speed selector wheel 9 is set to in the range between 500 r.p.m. and 3,000 r.p.m. it will remain there when the operator removes his hand from the wheel, because the wheel is not acting against the resistance of spring 16 as it would were the rotation in the counterclockwise direction beyond the position corresponding to 500 r.p.m. A conventional bimetallic overload protection device or the like can be used in this upper speed range to safeguard against overloading. For example, when overloading beyond a predetermined current value occurs, the overload protection device 23 causes motor 3 to shut off. A specially-constructed knob (not shown) can be depressed by the operator to restart motor 3. The overload protection device 23 can be installed to be operative at any other desired speed level besides 500 to 3,000 r.p.m.

The above-described rotational speed ranges have been given solely for the purpose of example. It is also possible to protect any other desired speed ranges against overloading by using the spring-returnable device described herein.

An additional feature which may be incorporated in the present invention is to provide a resistor 36 connectable by a switch 35 with the potentiometer means between switching contacts located at the zero position of the speed selector wheel and any other speed position, preferably the intermediate position. The resistor, when connected functions to maintain the rotational speed at a constant idling level whenever the speed selector wheel is rotated to a speed position which has a value less than that of the intermediate position. Thus, instead of a gradual decrease to a lower speed level, the rotational speed will instantaneously decline to a predetermined constant idling speed such as 50 r.p.m.

Without further analysis, the foregoing will so fully reveal the gist of the present invention that others can, by applying current knowledge, readily adapt it for various applications without omitting features which fairly constitute essential characteristics of the generic and specific aspects of the above-mentioned contribution to the art.

What is claimed as new and desired to be protected by Letters Patent is set forth in the appended claims:

1. In an electric power tool having electronic speed regulating means, a combination, comprising, motor means having an output member rotatable within a predetermined range of speeds; speed regulating means including adjustable potentiometer means and a regulating member for said potentiometer means, said member being manually movable, from a predetermined intermediate position in which the speed of said motor means is regulated to a predetermined speed, in one direction to a first end position, and a first plurality of positions between said predetermined intermediate position and said first end position to thereby regulate the speed of said motor means to a speed smaller than said predetermined speed, and in the opposite direction to a second end position and a plurality of second positions located between said predetermined position and said second end position to thereby regulate the speed of said motor means to a speed greater than said predetermined speed; and spring means for biassing said regulating member, when released, to said predetermined intermediate position only from positions spaced in said one direction from said intermediate positions so as to automatically regulate the speed of said motor means upon release of said regulating member at least to a speed equal to said predetermined speed.

2. A combination as defined in claim 1, and further comprising a housing having an opening, a carrier received in said opening and secured to said housing, switch means for bypassing the electronic speed regulating means and for connecting said motor means directly to a source of electrical current, said regulating member and said potentiometer means being mounted on said carrier coaxially with said switch means.

3. A combination as defined in claim 1, further comprising at least one stop means for engaging said spring means in said predetermined intermediate position of said regulating member, said spring means being arranged to store energy in response to movement of said regulating member in said one direction.

4. A combination as defined in claim 3, wherein said regulating member comprises a rotary element adjacent to said potentiometer means and wherein said spring means comprises a torsion spring having two end portions, one of which is fixed and the other of which is movable with respect to said stop means, said torsion spring surrounding the axis of said rotary element.

5. A combination as defined in claim 4, wherein said rotary element includes a motion transmitting portion which contacts said movable end of said when said spring when said rotary element is in said predetermined intermediate position.

6. A combination as defined in claim 1, further comprising resistor means connectable in circuit with said potentiometer means between said predetermined intermediate position and one of said end positions to maintain said speed at a predetermined value, and switch means for connecting and disconnecting said resistor means in circuit with said motor means.